United States Patent [19]

Yvon

[11] Patent Number: 5,054,320

[45] Date of Patent: Oct. 8, 1991

[54] PENDULOUS ACCELEROMETER WITH ELECTROSTATIC REBALANCING

[75] Inventor: Amand Yvon, Soisy Sous Montmorency, France

[73] Assignee: Societe d'Applications Generales d'Electricite et de Mecanique Sagem

[21] Appl. No.: 503,123

[22] Filed: Mar. 28, 1990

Related U.S. Application Data

[63] Continuation of Ser. No. 212,010, Jun. 27, 1988, abandoned.

[30] Foreign Application Priority Data

Jun. 30, 1987 [FR] France .............................. 87 09229

[51] Int. Cl.$^5$ .............................................. G01P 15/13
[52] U.S. Cl. ................................................. 73/517 B
[58] Field of Search ................. 73/517 B, 517 R, 505, 73/517 AV

[56] References Cited

U.S. PATENT DOCUMENTS

| | | | |
|---|---|---|---|
| 3,913,406 | 10/1975 | Johnston | 73/517 B |
| 4,345,474 | 8/1982 | Deval | 73/517 B |
| 4,353,254 | 10/1982 | Schroeder et al. | 73/517 B |
| 4,483,194 | 12/1984 | Rudolf | 73/517 R |
| 4,600,934 | 7/1986 | Aine et al. | 73/517 R |
| 4,638,669 | 1/1987 | Chou | 73/517 R |
| 4,679,434 | 7/1987 | Stewart | 73/517 B |
| 4,699,006 | 10/1987 | Boxenhorn | 73/517 AV |
| 4,736,629 | 4/1988 | Cole | 73/517 R |

Primary Examiner—John E. Chapman
Attorney, Agent, or Firm—Larson and Taylor

[57] ABSTRACT

The accelerometer is suitable for use on missiles subjected to high acceleration forces on start. It comprises a base and a flat pendulum mounted on the base for oscillation about a rotation axis located in the plane of the pendulum. The distance between the center of gravity of the pendulum and the rotation axis is small as compared with the span of the pendulum. Electrodes are carried by a face of the pendulum on both sides of the axis and cooperate with electrodes carried by the base for generating an electrostatic balancing field. The pendulum has electrodes on one face only and that results in easier construction.

6 Claims, 5 Drawing Sheets

PENDULOUS ACCELEROMETER WITH ELECTROSTATIC REBALANCING

This application is a continuation of application Ser. No. 07/212,010 filed June 27, 1988, now abandoned.

BACKGROUND OF THE INVENTION

1. Technical Field

The invention relates to pendulous accelerometers with electrostatic rebalancing and a method of manufacturing same.

It relates more particularly to pendulous accelerometers of the type comprising a case and a flat pendulum mounted so as to be able to oscillate with respect to the case about an axis of rotation situated in the plane of the pendulum and the distance of which to the center of gravity is small with respect to the size of the pendulum, electrodes supported by a flat surface of the pendulum on each side of the axis being provided for cooperating with electrodes, carried by the case, for creating an electrostatic balancing field.

2. Prior Art

Pendulous accelerometers of the above-defined type are known (Frech Patent 2,509,471) whose pendulum is formed by a disk with substantially parallel conducting flat faces, connected to the case by hinges.

The advantage of a pendulum rotating about an axis close to the center of gravity over a pendulum formed by a disk rotating around an axis situated at the edge, is that the electrostatic forces required for rebalancing the pendulum are smaller. But the manufacturing tolerances mean that it is impossible to make the opposite faces of the pendulum strictly parallel. This lack of parallelism requires either that the air gaps between the electrodes of the pendulum and the electrodes of the case be given a relatively high value, so as to avoid excessive distance discrepancies between the different mutually confronting points or that complex and expensive manufacturing technologies be used. These pendulous accelerometers with slightly off-centered pendulous axis consequently do not constitute an appreciable advance over prior art accelerometers whose pendulum is a disk oscillating around an edge.

SUMMARY OF THE INVENTION

It is an object of the invention to provide an accelerometer of the above-defined type in which the air gap may be made quite small and which may however be produced using industrial methods. For that purpose, the invention provides an accelerometer characterized in that the electrodes are provided on a single face of the pendulum. The pendulum, a frame which supports it and the hinges which connect the pendulum to the frame belonging to the case are advantageously formed by a single machined part. The frame then has a flat face intended to be applied against a bottom wall having case electrodes for forming the case. Since the electrodes are placed on one side only of the pendulum, there is no condition of parallelism of the faces to be fulfilled. The weight of the pendulum may be small, for the face which does not carry any electrode may be recessed, while leaving the necessary rigidity. Two active parts only are required.

Since the interelectrode distance may be very small (less than 10 μm), the forces required for rebalancing the pendulum even when the measured acceleration is very high, may be obtained with voltages much smaller than in the case of prior pendulous accelerometers. By way of example, for an interelectrode gap of from 6 to 8 μm, a return voltage of some tens of Volts is sufficient for measuring accelerations up to 100 g. Furthermore, the existence of a very small air gap reduces the shocks when the accelerometer is suddenly subjected to a very high acceleration, possibly reaching for example 10,000 g in the case of an accelerometer carried by a projectile fired from a gun.

Because the electromechanical parts of the accelerometer can be made very small, the invention finds a particularly important application in the field of accelerometers for projectiles, which must in addition be of a moderate cost. The accelerometer lends itself moreover perfectly to complete integration on a semiconductor substrate. Such an integration has already been proposed in French Patent 2,585,474 but in the case of accelerometers, apparently for conventional applications, whose pendulum has electrodes on both its faces, which leads, in order to provide small interelectrode distances, to a very sophisticated technology.

The servo-control circuit may have different constructions. It is however of advantage to use a digital type circuit, for example of the type described in British 2,047,902, with cyclic operation.

The invention further provides a method of manufacturing a pendulous accelerometer of the abovedefined type, using chemical machining and vacuum deposition techniques which are now well mastered, which makes it possible, using masking, to manufacture simultaneously a large number of cases or pendulums.

The invention will be better understood from the following description of a particular embodiment of the invention, given by way of non-limiting example. The description refers to the accompanying drawings.

DETAILED DESCRIPTION OF PREFERRED EMBODIMENTS

Figure 1:
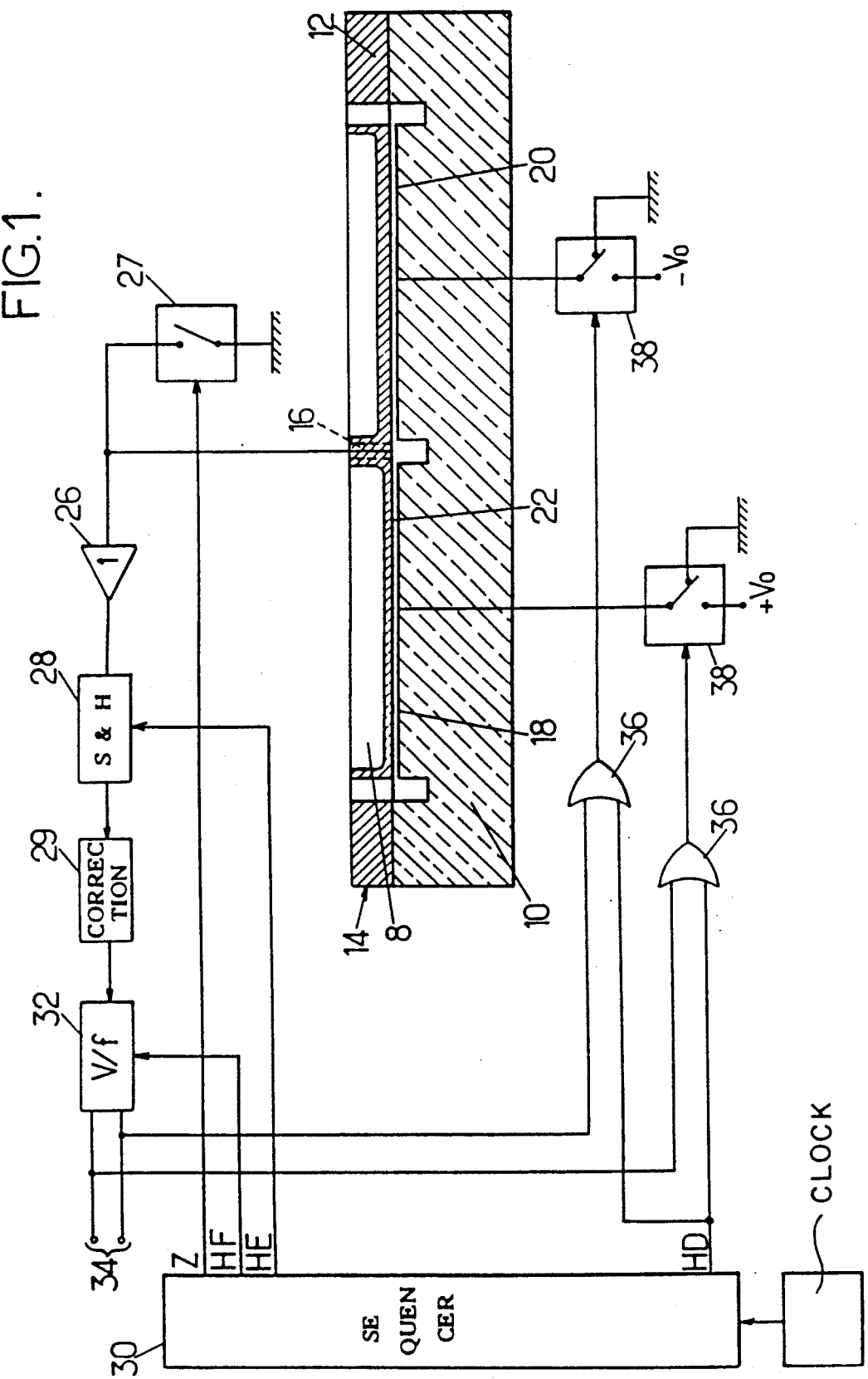
FIG. 1 is a block diagram comprising a simplified cross-section of the electromechanical part of the accelerometer and of the main components of an associated digital circuit.

The accelerometer shown in FIG. 1 comprises a base 10 belonging to or contained in a case and a pendulous unit 14. This unit comprises a rectangular shaped pendulum 8, able to rotate with respect to a frame 12 about an axis defined by hinges 16. Frame 12 is fixed to the base by bonding, thermocompression or thermoelectric connection for example. Base 10 carries two flat electrodes 18 and 20 for generating an electrostatic rebalancing field, connected to a measurement servo-control circuit which will be discussed further on.

Figure 2:
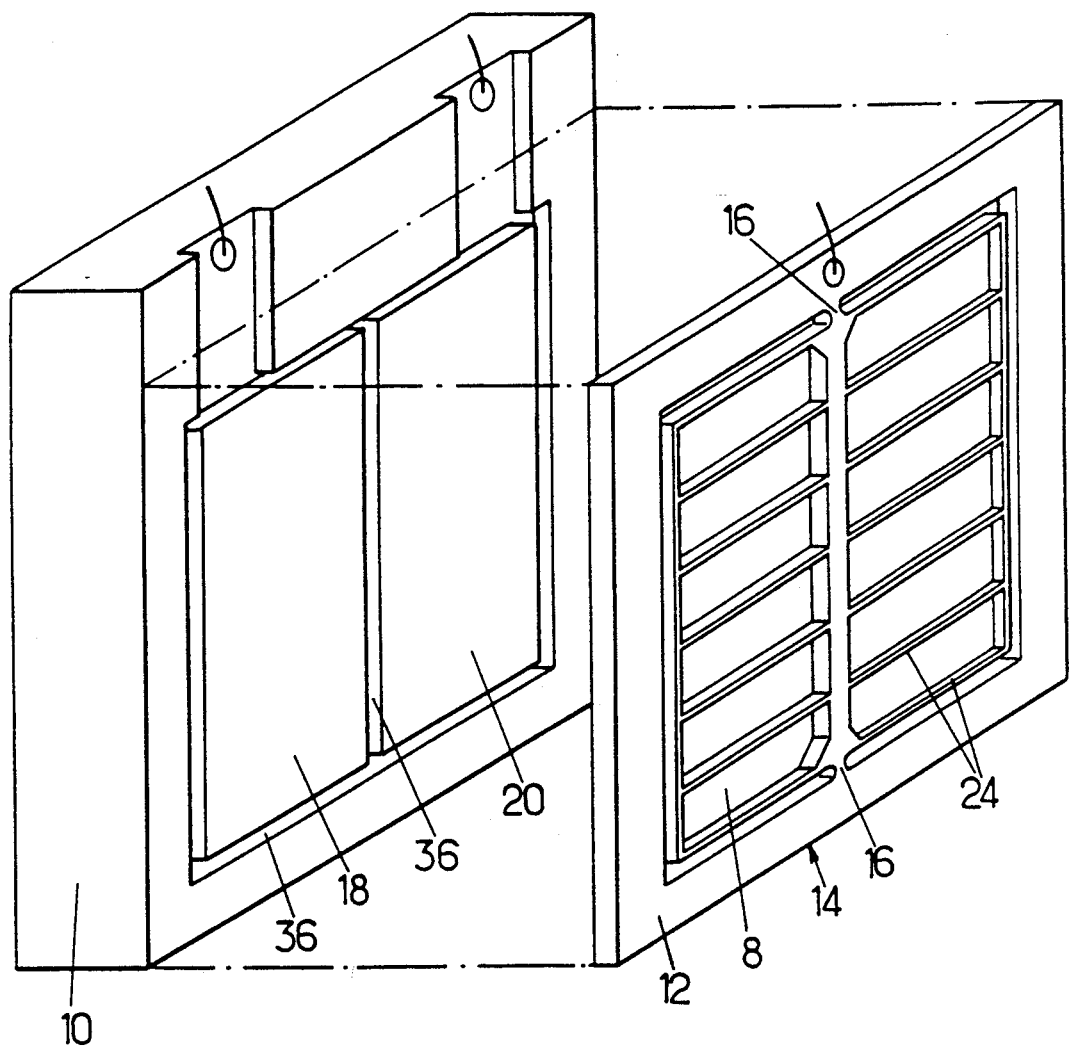
FIG. 2 is an exploded perspective view showing the relative construction and arrangement of a base belonging to the case and carrying electrodes for creating a balancing field and of the pendulum.

The pendulous unit 14 is advantageously constructed as shown in FIG. 2. The frame and the pendulum are formed by machining a solid piece of a material which may be electrically conducting, for the whole of the pendulum is at the same potential. Silicon may for example be used; it may be doped to increase its conductivity (for example by boron implantation). Then the material forming the base will typically be glass having a thermal expansion coefficient close to that of silicon. The pendulous unit 14 and base 10 may be made of the same material such as molten silica or quartz. In this case, the pendulum is rendered superficially conductive by a thin layer of chromium and gold or aluminium, as will be seen further on. The hinges 16 are formed by flexible blades of small thickness formed during machining, located in the mid-plane of the pendulum 8.

The pendulum has a flat conducting face 22, forming an electrode, substantially parallel to and opposing electrodes 18 and 20 and at a distance of a few $\mu m$ therefrom far forming an air gap for that purpose, the surfaces which support electrodes 18 and 20 are previously etched to form recesses with respect to the plane along which base 10 is fixed. The electrodes are formed by thin layers of chromium and gold or aluminum.

The pendulum has an imbalance with respect to its mid axis defined by hinges 16. It is of advantage to reduce as much as possible the weight of the pendulum as long as it does not detrimentally affect rigidity. The two objects are reached, in the embodiment shown in FIGS. 1 and 2, by forming in the pendulum deep recesses separated by strengthening ribs 24 disposed symmetrically with respect to the axis defined by hinges 16.

Figure 5:
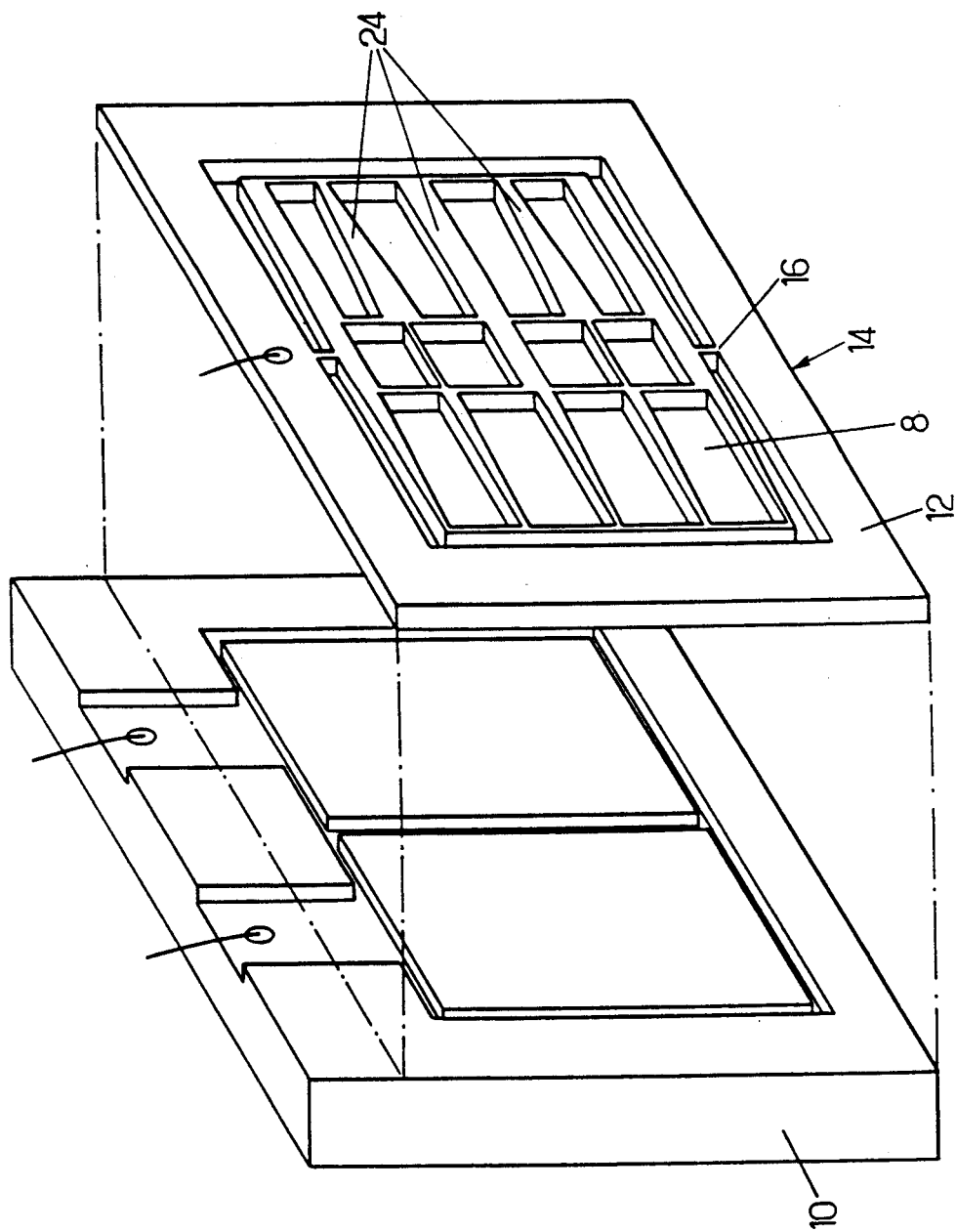
FIG. 5, similar to FIG. 2, shows another configuration of the pendulum, with recesses of identical depth, unbalance being obtained by an asymmetric arrangement of the strengthening walls and identical stiffnesses of the wings of the pendulum.

Different arrangements may be contemplated so as to obtain imbalance of the pendulum. The recesses on the two sides of the axis may have different depths and/or the ribs may be given different widths as shown in FIG. 5. It is important for the two "wings" of the pendulum to have the same stiffness and the pendulum will be formed so as to fulfil that condition.

Different measurement and servo-control circuit constructions can be used.

In the embodiment shown in FIG. 1, calibrated voltage pulses of predetermined amplitude and time duration are applied to one or the other of the electrodes 18 and 20 until the capacities of the two capacitors formed by these electrodes with electrode 22 have equal values.

The electric return force exerted in a predetermined direction is proportional to the frequency of the calibrated voltage pulses to one of the capacitors. The return force balances the accelerometric force, itself proportional to the acceleration, whereby the frequency of the applied pulse is representative of the amount of acceleration.

The measurement is made in successive cycles, each comprising a detection period and a rebalance period. To fulfil the detection function, electrode 22 of the pendulum is connected to the input of a follower amplifier 26, which input is alternately grounded and separated from ground by a switch 27 controlled by a sequencer 30 having a clock H (e.g. at 10 MHz), at a fixed frequency which may be between some kHz and some tens of kHz. The follower amplifier 26 drives a sample and hold circuit 28 controlled by an output $H_E$ of the sequencer 30. The analog signal delivered by the sampler 28 and processed by a damping correction circuit 29 is applied to a voltage/frequency converter 32. The output pulses from the voltage/frequency converter are applied to one or other of two output terminals 34, depending on the direction of the acceleration. The electrodes 18 and 20 may respectively be brought to voltages $+V_O$ and $-V_O$ by identical circuits, each comprising and OR gate 36 and a switch 38 controlled by the output of the OR gate. The switch 38 associated to the electrode 18 places the latter at voltage $+V_O$ when the output of the corresponding gate 36 is at 1, to ground in the opposite case. An input of each OR gate 36 receives periodical pulses from an output $H_D$ of the sequencer 30. The other switch 38 places electrode 20 to ground or to the voltage $-V_O$.

The rebalancing pulses are applied to electrodes 18 or 20 by controlling the corresponding switch 38 through the associated OR gate, whose second input is connected to one of the outputs 34.

Figure 3:
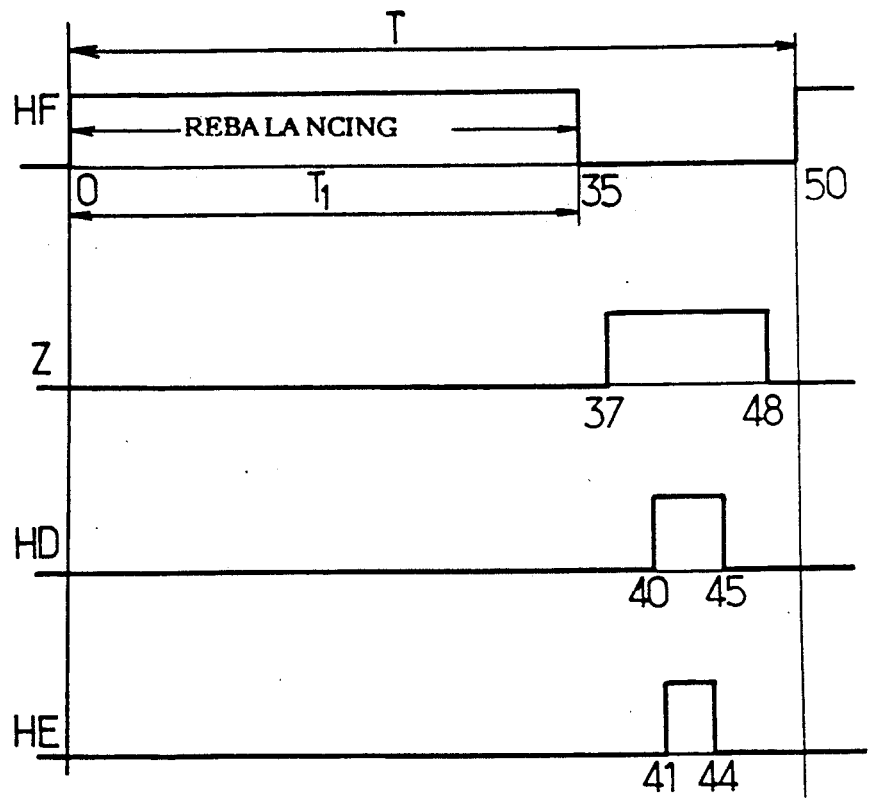
FIG. 3 is a timing diagram of operation.

Operation during a cycle T, which will be assumed to be 50 $\mu s$, takes place as shown in the timing diagram of FIG. 3 where the letters at the beginning of each line indicate the corresponding outputs of the sequencer 30 of FIG. 1.

Each period T is divided between a rebalancing period, during which one or other of switches 38 may be closed, and a detection period. The rebalance period is shown in FIG. 3 as being of duration $T_1$, from the beginning of the cycle to 35 $\mu s$.

After the rebalance period $T_1$, the output Z of sequencer 30 opens switch 27, during a time period which extends from 37 $\mu m$ to 48 $\mu s$ from the beginning of the cycle as shown in FIG. 3. Detection takes place during a period extending between 40 and 45 $\mu s$ after the beginning of the cycle and is caused by closure of the two switches 38 in response to a signal delivered by the output $H_D$. Closure of switches 38 places the electrodes 18 and 20 at voltages $+V_O$ and $-V_O$, respectively. Electrode 22 then takes a voltage which is zero if the pendulum is balanced and, if not, is in direct relation with the angular slant of the pendulum, with a polarity which depends on the direction of the slant. The voltage is adapted by amplifier 26 and sampled at 28 when the output $H_E$ of sequencer 30 delivers a pulse (pulse from 41 to 44 $\mu s$ as shown in FIG. 3). The sample and hold circuit 28 stores the unbalance voltage for the rest of the cycle. This voltage is processed by the correction circuit 29 then applied to the voltage/frequency converter 32. The converter permanently receives high frequency pulses from the HF output of sequencer 30 and directs them (or not) to one or the other of outputs 34, depending on the polarity of electrode 22. The output pulses, during the rebalance periods 32, close that one of switches 38 which causes rebalancing. The mean frequency of the pulses is proportional to the acceleration. An analog measurement of this acceleration consists of the output voltage of correction circuit 29, possibly consisting of a passive network.

As a particular embodiment, the manufacture of a miniaturized accelerometer for measuring accelerations up to about 100 g, which can be produced at a low price and in a volume less than 2 $cm^3$ will now be described.

The pendulum 8 of such an accelerometer may have a total thickness of 350 $\mu m$ and a length and a width of about 6 mm.

Several bases 10 may be simultaneously formed from a plate of quartz obtained by melting, having two parallel faces polished by conventional mechanical etching. Grooves 36, for defining the positions of electrodes 18 and 20, may be produced by photolithography with a conventional mask.

Similarly, several pendulous units 14 each formed of a pendulum 8 and its frame 12 may be manufactured simultaneously by photolithography, then chemical etching through a mask. The bases and the assemblies are separated from each other then the air gap, typically of from 6 to 8 μm, is formed by selective etching through a mask. In the case of a pendulum having a thickness of 350 μm, the chemical action reduces the thickness of the bottom of the recesses to a few tens of μm.

The electrodes may be formed by vacuum cathodic sputtering producing a layer whose thickness is in the 0.1 μm order of magnitude. Junction wires may be connected by thermoelectric welding.

Figure 4:
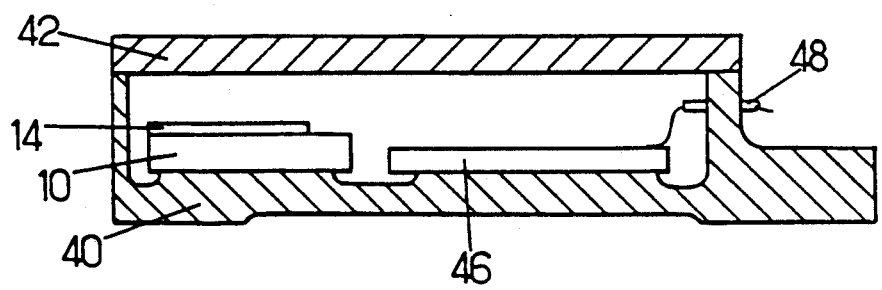
FIG. 4 is a simplified sectional view showing a possible way of mounting the components of the accelerometer in a sealed case.

The associated electronic circuit may be formed using hybrid technology and be supported by an extension of the base, or even integrated in this base if the latter is made of silicon which is superficially oxidized under electrodes 18 and 20. This arrangement makes it possible to place the amplifier 26 in immediate vicinity of the electrodes. As shown in FIG. 4, the base is fixed to the bottom of a case 40 closed by a lid 42. An integrated circuit 46 is placed on the bottom adjacent to the side of the base and is provided with output wires connected to sealed through pins 48 which sealingly project through the case wall.

Since the accelerometer may have a very small air gap, return voltages $+V_0$ and $-V_0$ may be adopted which are also small, ±15 V for example. Since the measurement is made by pulse counting, miniaturized digital circuits may be used.

Numerous modifications of the invention are possible; in particular, other digital or analog circuits may be used instead of the circuit which has been described.

Figure 6:
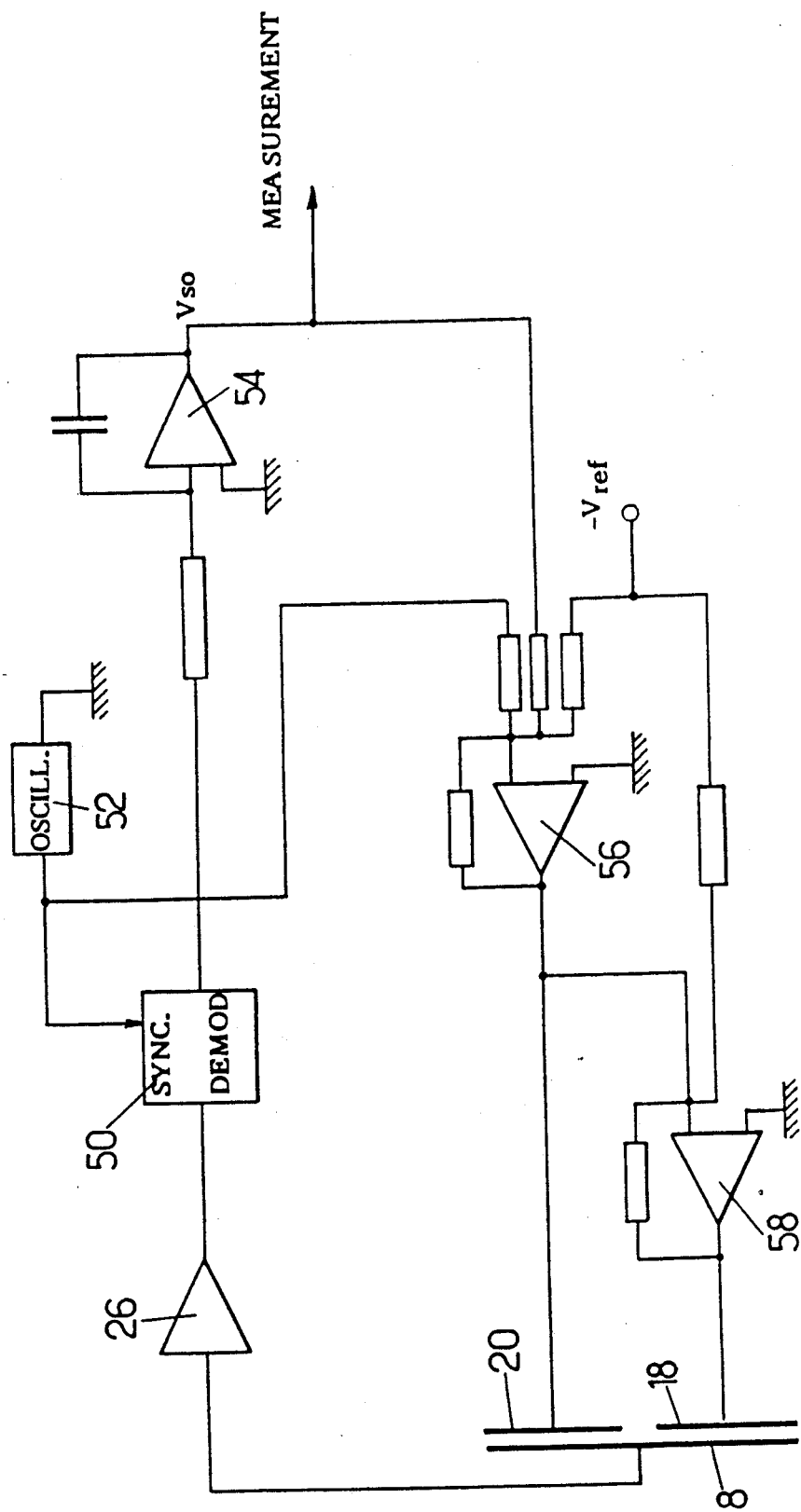
FIG. 6, similar to FIG. 1, illustrates an analog, rather than digital, embodiment.

Referring to FIG. 6, where the elements corresponding to those of FIG. 1 are designated by the same reference number, an analog embodiment is illustrated as an example. The amplified measurement signal is applied to a synchronous demodulator 50 which receives a reference sine-shaped voltage from an oscillator 52, at 20 MHz for instance. The DC output voltage of demodulator 50 is applied to an integrator 54 which delivers the measurement voltage Vsi and drives the rebalance amplifier 56. The operational amplifier 56 receives voltage Vsi, the output A sin wt of oscillator 52 and a DC reference voltage $-V_{ref}$ ($-15$ Volts for instance) through respective resistors of equal values. The output of amplifier 56, equal to $+2V_{ref} \pm 2V_{si} - A \sin wt$ is applied to electrode 20. The other electrode 18 receives the output of amplifier 56 through another summing amplifier 58 which delivers a signal equal to $+2V_{ref} \pm 2V_{si} + A \sin wt$ Again, such a circuit may operate with low supply voltages, for instance +15 Volts and −15 Volts.

I claim:

1. Rebalance electrostatic accelerometer, comprising:
a flat pendulum, having a center of gravity,
a base member including means for supporting the pendulum for oscillation of limited amplitude about a rotation axis located in the plane of the pendulum and whose distance to the center of gravity is small as compared with the span of the pendulum on both sides of the rotation axis,
a first electrode carried by one major face only of the pendulum symmetrically with respect to the axis,
a pair of mutually identical second electrodes formed on the base member, substantially parallel to the first electrode, each located on one side of the rotation axis and each forming a respective capacitor with a respective portion of the first electrode, and
means for applying respective voltages to said second electrodes for generating a rebalancing electrostatic field restoring the pendulum to a predetermined balanced condition,
wherein the pendulum has a shape of a sheet symmetrical with respect to the rotation axis, both sides of the major face of the sheet opposed to the major face carrying the pendulum electrodes being each formed with a plurality of recesses and the recesses located on one side of the rotation axis being different from the recesses located on the other side of the rotation axis.

2. Accelerometer according to claim 1, wherein the recesses on said one side have a different depth from the recesses on the other side.

3. Accelerometer according to claim 1, wherein the recesses on each of said sides are separated by reinforcing ribs and wherein the ribs on said one side have a width different from the width of the ribs on the other side.

4. Accelerometer according to claim 1, wherein the pendulum is integral with a frame and with hinges defining the rotation axis and connecting said pendulum to the frame.

5. Accelerometer according to claim 4, wherein the base member is secured to the frame by bonding.

6. Accelerometer according to claim 1, wherein the distance between mutually opposed electrodes is smaller than 10 μm at rest.

* * * * *